United States Patent
Eisen et al.

(10) Patent No.: US 9,743,008 B2
(45) Date of Patent: Aug. 22, 2017

(54) SENSOR FOR CAPTURING A MOVING MATERIAL WEB

(71) Applicant: Texmag GmbH Vertriebsgesellschaft, Thalwil (CH)

(72) Inventors: Juergen Eisen, Augsburg (DE); Lars Zwerger, Augsburg (DE)

(73) Assignee: TEXMAG GMBH VERTRIEBSGESELLSCHAFT, Thalwil (CH)

( * ) Notice: Subject to any disclaimer, the term of this patent is extended or adjusted under 35 U.S.C. 154(b) by 63 days.

(21) Appl. No.: 13/970,329

(22) Filed: Aug. 19, 2013

(65) Prior Publication Data

US 2014/0063309 A1 Mar. 6, 2014

(30) Foreign Application Priority Data

Aug. 28, 2012 (EP) .................. 12006111

(51) Int. Cl.
*H04N 5/235* (2006.01)
*G01B 11/00* (2006.01)

(52) U.S. Cl.
CPC .......... *H04N 5/235* (2013.01); *G01B 11/00* (2013.01)

(58) Field of Classification Search
CPC ...... H04N 5/235; H04N 5/2354; G01B 11/00; G01B 11/02; G01B 11/022; G01B 11/06; G01B 11/0616; G01B 11/0625; G01B 11/0641; G01B 11/065; G02B 5/30; G02B 5/3008; G02B 5/3016; G02B 5/3066; G01N 21/21; G01N 21/211; G01N 21/215; G01N 21/8645; G01N 2021/8848; G01N 21/86; G01N 2021/8663; G01N 2021/8609; G01N 21/89; G01N 21/956; G01N 21/95684; G07D 7/12; G07D 7/124; G07D 7/121; D06H 3/08; G06H 3/12; G06H 3/125

See application file for complete search history.

(56) References Cited

U.S. PATENT DOCUMENTS

| | | | | |
|---|---|---|---|---|
| 2,119,164 A * | 5/1938 | Himmell | ............. | B41M 5/5218 101/491 |
| 2,227,494 A * | 1/1941 | Gold | ............. | D21H 5/0062 118/106 |
| 3,699,350 A * | 10/1972 | Holdaway | ............. | 250/225 |
| 3,779,649 A * | 12/1973 | Bertoya et al. | ............. | 356/430 |
| 4,013,343 A * | 3/1977 | Jaccard et al. | ............. | 359/274 |
| 4,536,709 A * | 8/1985 | Ishida | ............. | 324/239 |
| 4,931,657 A * | 6/1990 | Houston et al. | ............. | 250/559.08 |

(Continued)

FOREIGN PATENT DOCUMENTS

| EP | 2157401 A1 | 2/2010 |
|---|---|---|
| WO | WO 94/15172 A1 | 7/1994 |
| WO | WO 2006/052644 A2 | 5/2006 |

*Primary Examiner* — John Lee
(74) *Attorney, Agent, or Firm* — Epstein Drangel LLP; Robert L. Epstein

(57) ABSTRACT

A sensor (1) serves for capturing a moving material web (2). It has at least one light source (4) and at least one light detector (10). At least one polarization element (15) is provided between the two, which polarization element influences polarization properties of the light transmitted by the polarization element (15) as a function of an electric field. Markings such as for example metal strips (13) in the material web (2) can thus be captured in the light detector (10) without problem.

13 Claims, 1 Drawing Sheet

(56) References Cited

U.S. PATENT DOCUMENTS

| | | | | |
|---|---|---|---|---|
| 4,972,091 | A * | 11/1990 | Cielo et al. | 250/559.42 |
| 5,066,865 | A * | 11/1991 | Wennerberg | G01N 21/474 |
| | | | | 250/559.01 |
| 5,093,184 | A * | 3/1992 | Edwards | D21H 21/42 |
| | | | | 283/114 |
| 5,138,162 | A * | 8/1992 | Hacskaylo | 250/330 |
| 5,563,809 | A * | 10/1996 | Williams et al. | 702/84 |
| 5,974,160 | A * | 10/1999 | Shiratori et al. | 382/112 |
| 6,097,482 | A * | 8/2000 | Smith et al. | 356/237.1 |
| 6,113,835 | A * | 9/2000 | Kato et al. | 264/400 |
| 6,639,673 | B1 * | 10/2003 | Freund et al. | 356/369 |
| 6,788,411 | B1 * | 9/2004 | Lebens | 356/394 |
| 6,856,385 | B2 * | 2/2005 | Wei et al. | 356/73 |
| 7,369,240 | B1 * | 5/2008 | Abbott et al. | 356/429 |
| 7,551,274 | B1 * | 6/2009 | Wornson et al. | 356/239.1 |
| 7,973,921 | B2 * | 7/2011 | Silberstein et al. | 356/237.3 |
| 8,886,946 | B1 * | 11/2014 | Fraser et al. | 713/176 |
| 2002/0159153 | A1 * | 10/2002 | Nishimura et al. | 359/578 |
| 2003/0106994 | A1 * | 6/2003 | Sage | 250/271 |
| 2003/0164611 | A1 * | 9/2003 | Schneider | G06K 19/07749 |
| | | | | 283/57 |
| 2004/0124398 | A1 * | 7/2004 | Kuntz et al. | 252/299.01 |
| 2004/0247824 | A1 * | 12/2004 | Faris et al. | 428/100 |
| 2005/0190345 | A1 * | 9/2005 | Dubin et al. | 353/85 |
| 2007/0166536 | A1 * | 7/2007 | Dollase | C08J 7/04 |
| | | | | 428/343 |
| 2007/0206183 | A1 * | 9/2007 | Lebens | 356/237.2 |
| 2007/0285665 | A1 * | 12/2007 | Shimoda | 356/430 |
| 2008/0035736 | A1 * | 2/2008 | Tompkin | G07D 7/00 |
| | | | | 235/488 |
| 2009/0028417 | A1 * | 1/2009 | Floeder et al. | 382/141 |
| 2009/0323052 | A1 * | 12/2009 | Silberstein et al. | 356/237.5 |
| 2010/0276076 | A1 * | 11/2010 | McDonnell | B44C 3/02 |
| | | | | 156/247 |
| 2010/0279231 | A1 * | 11/2010 | Sandtner | 430/312 |
| 2011/0007313 | A1 * | 1/2011 | Haran | G01J 3/02 |
| | | | | 356/328 |
| 2011/0187849 | A1 * | 8/2011 | Kim et al. | 348/131 |
| 2012/0003434 | A1 * | 1/2012 | Hiroya et al. | 428/195.1 |
| 2012/0076923 | A1 * | 3/2012 | Bucher | G01B 11/28 |
| | | | | 427/9 |
| 2013/0329037 | A1 * | 12/2013 | Shakespeare et al. | 348/88 |
| 2014/0063309 | A1 * | 3/2014 | Eisen et al. | 348/311 |
| 2014/0063310 | A1 * | 3/2014 | Eisen et al. | 348/311 |

* cited by examiner

SENSOR FOR CAPTURING A MOVING MATERIAL WEB

The present application claims priority to European Patent Application no: EP 12 006 111.4, filed Aug. 28, 2012.

FIELD OF THE INVENTION

The invention relates to a sensor for capturing a moving material web, in particular for capturing the position of a moving material web.

DESCRIPTION OF THE PRIOR ART

EP 2 157 401 A1 discloses an apparatus for measuring distances. Said apparatus consists of a light source and a light detector, which are decoupled via a beam splitter. Here, the light source transmits light through the beam splitter onto a sample to be investigated. Light reflected thereby is reflected by the beam splitter and guided to a detector. The distance of the sample from said apparatus is ascertained by capturing the time delay of the signals arriving at the detector.

DE 42 44 332 C1 discloses a method for measuring the roughness of technical surfaces. Here, an electro-optically active liquid is applied onto a metallic surface of a sample to be investigated. It is covered on its upper side by a planar and smooth electrode. An electric field, which is inhomogenous in dependence on the three-dimensional structure of the sample to be investigated, is generated between the metallic sample and the upper-side electrode. The entire arrangement is optically scanned so that an image of the three-dimensional surface structure of the sample is produced.

WO 2006/052644 A2 discloses a method for measuring the optical rotation of liquids. Here, the liquid to be examined is filled into a sample chamber and investigated using the transmitted-light method. The transmitted light is subsequently guided through an electro-optical element and through a polarizer, after which the light is converted into an electrical signal by a detector and correspondingly evaluated.

EP 1 154 225 B1 discloses a generic sensor for capturing a peripheral edge of or a marking on a moving material web. This sensor has a directed light source and a diffuse light source, which illuminate the material web. The light reflected by the material web is captured by a light detector and converted into an electrical signal. Said sensor has proven itself many times in practice and constitutes the starting point of the present invention.

The invention is based on the object of providing a sensor of the type mentioned in the introduction, which makes possible reliable capturing of the web edge or of a marking on the material web even under unfavourable conditions.

This object is achieved according to the invention with the following features.

BRIEF SUMMARY OF THE INVENTION

A sensor according to the invention is used for capturing a moving material web, specifically in particular capturing the position of the material web on the basis of a marking provided on the material web. The sensor has at least one light source, which transmits emission light at the material web. It is not important in this case whether said at least one light source itself is directed at the material web, or if the emission light is deflected, using optical means, such as for example mirrors, prisms, lenses or the like, such that it ultimately strikes the material web. What is crucial is only that at least a partial region of the material web is illuminated by the emission light. The sensor additionally has at least one light detector, which receives detection light. Said detection light is here emitted by the at least one light source and influenced by the material web. Possible influences are in particular reflection, absorption and transmission. These are dependent both on the optical properties and on the relative position of the material web with respect to the incident emission light. It is thus possible in principle to capture the position of the material web from the detection light that is reflected or transmitted by the material web.

In unfavourable cases it is possible, however, that the dependence of the detection light on the position of the moving material web is too small for the position of the material web to be ascertained from the detection light. For example, if the intention is to capture the position of a metal strip provided on the material web, wherein the entire material web is sprayed with clear varnish, only a relatively small contrast between the metal strip and the remaining material web is produced, which hinders reliable capturing of the position of the metal strip. In order to make possible reliable capturing of the position of the material web even under these more difficult conditions, at least one polarization element is provided between the at least one light source and the at least one light detector. The word "between" in this context does not necessarily mean that the polarization element needs to be located spatially between the at least one light source and the at least one light detector. Rather, it is necessary that the polarization element is located between the at least one light source and the at least one light detector in the optical meaning of the word, that is to say in the beam path between the two. The polarization element can be arranged between the at least one light source and the material web or between the material web and the at least one light detector. If a plurality of polarization elements are provided, they can also be arranged on both sides of the material web. Light will therefore travel through the at least one polarization element in any case. Light exiting the polarization element is referred to below as "transmission light". The polarization element is in this case arranged spatially between capacitor electrodes, which can produce an electric field by applying an electrical voltage. The polarization element is in this case configured such that it can influence the polarization of the transmission light as a function of the applied electric field. By appropriately choosing the electrical voltage applied to the capacitor electrodes, the polarization state of the transmission light can thus be influenced. By appropriately choosing the polarization state using the applied electrical voltage, it is possible even under unfavourable conditions to reliably scan a marking on the moving material web. Provision is made in particular for the voltage applied to the capacitor electrodes to vary such that a selected guidance criterion of the moving material web produces optimum contrast. It is not important either whether the at least one polarization element is arranged between the at least one light source and the material web and/or between the material web and the at least one light detector. What is crucial is only that the polarization state of the light is influenced somewhere between the at least one light source and the at least one light detector.

At least one liquid crystal has proven suitable as the at least one polarization element. Said liquid crystal is provided between two capacitor electrodes, which are preferably structured with approximately parallel grooves. The grooves in both capacitor electrodes are orientated with respect to one another at an angle, preferably of 90°. Without an external electric field, the molecules of the liquid crystal arrange themselves such that they describe a helix between the capacitor electrodes. This helix-shaped arrangement results in a rotation of polarized light by the angle that is enclosed by the grooves in the two capacitor electrodes. If a sufficiently strong electric field is applied between the capacitor electrodes, the liquid-crystal molecules arrange themselves parallel to the electric field such that the rotation of the polarization direction of the transmission light disappears. Even with very small electric fields it is thus possible to influence the polarization of the transmission light. In the case of a reduction of the electric field strength below a critical value, the liquid-crystal molecules are no longer completely aligned with the electric field, but organized in the form of domains. Within said domains, the transmission light is therefore not influenced in terms of its polarization direction, while it is correspondingly rotated outside the domains. Therefore, after passage through the liquid crystal, transmission light which in part has the original polarization direction and in part a rotated polarization direction is obtained. In this way it is possible to mix different polarization directions so as to optimize in this manner the contrast in the detection light. To this end, it is merely necessary for the applied electrical voltage between the capacitor electrodes to vary.

Alternatively, the at least one polarization element can also have at least one Pockels cell. Said Pockels cell utilizes a linear electro-optical effect, by way of which, when an electric field is applied, the refractive index of a crystal changes linearly with the electric field. The crystal used in this case is in particular a birefringent crystal, such that the change in the refractive index results in a rotation of the polarization plane of the transmission light. In this manner, it is possible to set the polarization plane of the transmission light in an arbitrary manner by varying the electrical voltage applied between the capacitor electrodes. The capacitor electrodes can in this case be arranged transversely or longitudinally with respect to the direction of the transmission light. In the case of the transverse arrangement, the optical properties of the capacitor electrodes play no role, because light does not have to pass through them. The choice of capacitor electrode materials is therefore free. By necessity, transparent capacitor electrodes must be used in the case of the longitudinal arrangement. However, the necessary electrical voltage can thus be significantly reduced by cascading a large number of very thin, birefringent crystals which in each case require only a very small electrical voltage.

Alternatively, provision is made for the at least one polarization element to have at least one Kerr cell. Said Kerr cell utilizes a non-linear electro-optical effect, which is present in some birefringent crystals to influence the polarization direction of the transmission light.

Most of the suitable polarization elements effect merely a rotation or mixing of various polarization states of the transmission light. In this case it is necessary for linearly or circularly polarized light to be guided to the polarization element, so that the change in the polarization state in fact has a noticeable effect. To this end it is advantageous if at least one polarization filter is provided between the at least one light source and the at least one light detector. Once again, "between" is here understood to mean "located in the beam path". The at least one polarization filter can be arranged between the at least one light source and the material web or between the material web and the at least one light detector. If a plurality of polarization filters are provided, they can also be arranged on both sides of the material web. Suitable polarization filters are for example plastic layers with aligned polymer chains, which absorb light of a particular polarization direction. Alternatively, polarization properties of dielectric and/or metallic boundary surfaces could also be used as polarization filters.

Alternatively or additionally, it is advantageous if the at least one light source is configured such that the emission light is linearly polarized. An additional polarization filter can thus be omitted. One example for a linearly polarized light source is a gas laser, which has a gas cuvette with inclined windows inside a laser resonator. A gas laser of this type can only emit linearly polarized light.

If the emission light or the transmission light strikes the material web at an acute angle with respect to a normal on the material web, the result is a strong dependence of the light reflection on the polarization direction in particular in the case of dielectric material webs or material webs with dielectric covering layers, such as for example clear varnish layers. It is thus possible to effectively scan difficult material webs by appropriately choosing the polarization direction or a corresponding mixing of different polarization directions.

A suitable angle for the acute angle has been found to be the Brewster angle. The Brewster angle depends only on the refractive index of the dielectric medium. If light strikes the material web exactly at the Brewster angle, light having a polarization direction which is parallel to the material web is not reflected. Therefore, the entire reflected light originates exclusively from the polarization that is perpendicular to the material web. Although this condition is no longer 100% true near the Brewster angle, the reflection of the parallel polarization is, however, extremely low in this region. It is thus not necessary to have the exact Brewster angle, rather the reflection is also very strongly polarization-dependent in a region around the Brewster angle. As a result, the detection light in this region of the angle of incidence has a very strong polarization dependence and can therefore be influenced well by the polarization element. For example it is possible in this manner to completely eliminate the reflection of the clear varnish.

BRIEF DESCRIPTION OF THE SEVERAL VIEWS OF DRAWINGS

Other advantages and characteristics of this invention will be explained in the detailed description below with reference to the associated figures that contain several embodiments of this invention. It should however be understood, that the figures are just used to illustrate the invention and do not limit the scope of protection of the invention.

Wherein.

DETAILED DESCRIPTION OF THE INVENTION

Figure 1:
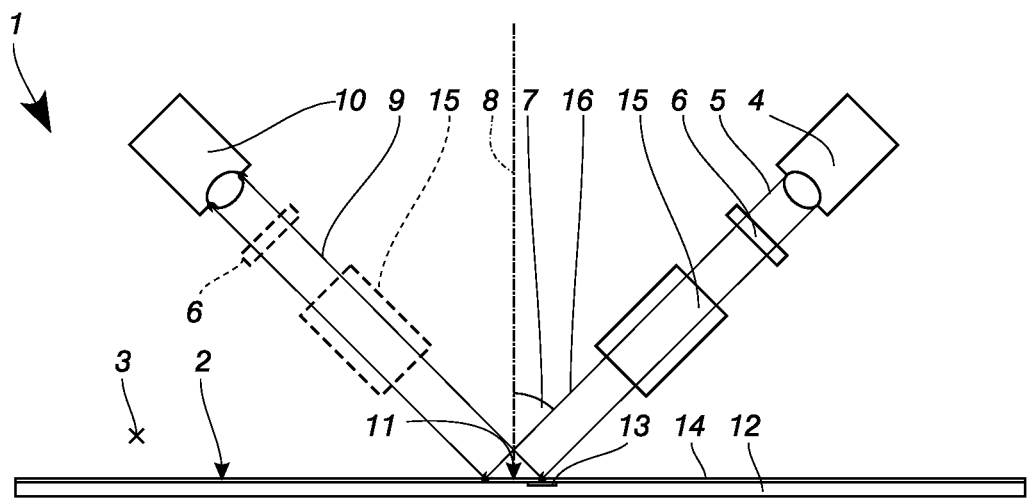
FIG. 1 shows a schematic principle illustration of a sensor.

A sensor 1 according to FIG. 1 serves for capturing a moving material web 2, which moves along a direction of motion 3 which is directed towards the observer. The sensor 1 has a light source 4 which emits emission light 5. Arranged downstream of the light source 4 is a polarization filter 6, which linearly polarizes the emission light 5. The emission light 5 that is thus polarized strikes the material web 2—at an acute angle 7 measured with respect to—a normal 8. Part of the incident light is reflected by the material web 2, wherein the reflectivity depends both on the polarization state of the incident light and on the material properties of the material web 2. The reflected detection light 9 finally travels to a light detector 10, which is configured for example as a camera. This can be used to capture a detail 11 of the material web in a spatially resolved manner. An additional polarization filter 6 can optionally be arranged upstream of the light detector 10.

In the exemplary embodiment according to FIG. 1, the material web 2 consists for example of a polymer carrier 12, in which a marking 13 in the form of a metal strip is embedded. This marking 13 consists for example of aluminium, but alternatively can also be made of any other metal. Provision is made for this marking 13 to be captured by the sensor 1, so that the material web 2 is guided depending on the position of the marking 13. This could be achieved in principle by a suitable choice according to a bright field or dark field illumination. In the present exemplary embodiment, the material web 2 is, however, additionally provided on the upper side with a clear varnish 14. This clear varnish 14 forms a dielectric layer on the surface of the material web 2, such that both bright field illumination and dark field illumination fail in the case of this material web type.

In order to still capture the position of the marking 13 in the light detector 10, a polarization element 15 is provided in the beam path between the polarization filter 6 and the material web 2. This polarization element 15 can influence the polarization of the transmission light 16 that passes through it as a function of an applied electric field. In this manner, the polarization of the transmission light 16 can be changed such that the marking 13 is capturable in the light detector 10 with high contrast. Alternatively or additionally, the polarization element 15 can also be arranged—as indicated in dashed lines—between the material web 2 and the light detector 10, without the function of the apparatus 1 being adversely affected. The use of two polarization elements 15 on either side of the material web 2 is also conceivable.

Figure 2:
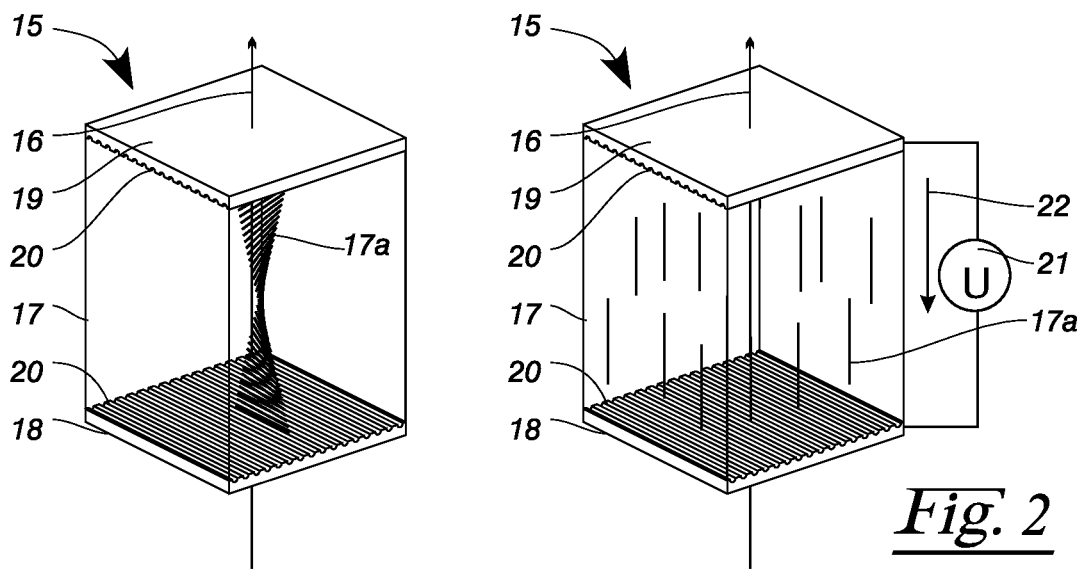
FIG. 2 shows a first embodiment of a polarization element.

FIG. 2 shows, on the left-hand side, a first embodiment of the polarization element 15. The polarization element 15 in this case has a liquid crystal 17, which is for example in a nematic phase.

The liquid crystal 17 is arranged spatially between two capacitor electrodes 18, 19. Said capacitor electrodes 18, 19 have grooves 20 which are in each case mutually parallel. The grooves 20 of the capacitor electrode 18 are rotated by 90° with respect to the grooves 20 of the capacitor electrode 19. Liquid-crystal molecules 17a are here arranged in each case parallel to the respective grooves 20 such that they—viewed in the direction of the transmission light 16—assume a helical configuration. As a result, the polarization direction of the transmission light 16 is rotated by 90°. The angle of rotation in this case corresponds to the angle between the grooves 20 of the capacitor electrodes 18, 19.

The right-hand side of FIG. 2 again shows the polarization element 15. In contrast to the left-hand illustration, here a voltage source 21 is connected between the capacitor electrodes 18, 19. Owing to the applied voltage, the capacitor electrodes 18, 19 produce an electric field 22 in the liquid crystal 17. If the electric field 22 is strong enough, the liquid-crystal molecules 17a of the liquid crystal 17 align themselves parallel to the electric field 22. The effect of the liquid crystal 17 on the polarization of the transmission light 16 thus disappears. Therefore, its polarization direction remains unchanged. By varying the voltage of the voltage source 21, the proportion of the regions of the liquid crystal 17 which are aligned with the electric field 22 can be varied. In this manner, various polarization directions can be mixed in the transmission light 16.

Alternatively, the liquid crystal 17 can, depending on the physical properties, also rotate the polarization of the transmitted light by applying a voltage and leave the electric field unchanged.

Figure 3:
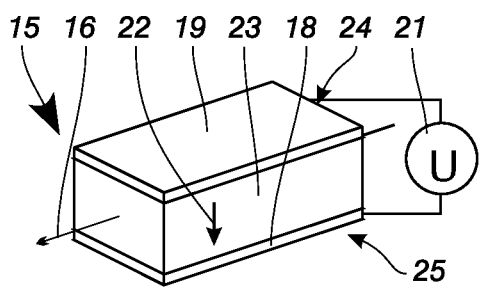
FIG. 3 shows a second embodiment of a polarization element.

FIG. 3 shows an alternative embodiment of the polarization element 15. The polarization element 15 here has a birefringent crystal 23, which is provided with the capacitor electrodes 18, 19. Said capacitor electrodes 18, 19 are in turn connected to the voltage source 21. The light radiates through the birefringent crystal 23. Owing to the linear electro-optical effect, the refractive index of the birefringent crystal 23 changes linearly with the electric field 22 produced by the capacitor electrodes 18, 19. Owing to the birefringence of the birefringent crystal 23, said change in refractive index results in a rotation of the polarization plane of the transmission light 16. The angle of rotation is here proportional to the electric field 22 and thus also proportional to the applied voltage produced by the voltage source 21. The birefringent crystal 23 together with the capacitor electrodes 18, 19 forms a Pockels cell 24.

If alternatively or additionally a non-linear electro-optical effect is utilized in the birefringent crystal 23, the arrangement of birefringent crystal 23 and the capacitor electrodes 18, 19 produces a Kerr cell 25.

Since some of the embodiments of this invention are not shown or described, it should be understood that a great number of changes and modifications of these embodiments is conceivable without departing from the rationale and scope of protection of the invention as defined by the claims.

REFERENCE SYMBOL LIST 1 sensor
2 material web
3 direction of motion
4 light source
5 emission light
6 polarization filter
7 acute angle
8 normal
9 detection light
10 light detector
11 detail
12 polymer carrier
13 marking
14 clear varnish
15 polarization element
16 transmission light
17 liquid crystal
17a liquid-crystal molecule
18, 19 capacitor electrode
20 groove
21 voltage source
22 electric field
23 birefringent crystal
24 Pockels cell
25 Kerr cell

The invention claimed is:

1. A sensor for capturing a position of a moving material web having a surface with a region, comprising a marking provided on the surface of the moving material web within the surface region, the surface region also including a surface portion outside said marking, wherein said marking is situated under a coating of clear varnish on the surface of the moving material web, said marking having a position being captured by said sensor, wherein said sensor comprises at least one light source transmitting emission light to said region of said material web and said emission light being influenced by said material web producing detection light, said sensor further comprising at least one light detector, which receives said detection light, wherein in order to achieve a high contrast between said s region outside said marking of said material web and said marking, at least one polarization element is provided between said at least one light source and said at least one light detector, said at least one polarisation element being penetrated by said emission light, said sensor further comprising capacitor electrodes, producing an electric field that influences said polarization of said emission light by way of applying an electrical voltage between said capacitor electrodes, wherein said at least one polarization element is arranged spatially between said capacitor electrodes, and wherein said at least one light detector is configured as a camera.

2. The sensor according to claim 1, wherein said at least one polarization element comprising at least one liquid crystal.

3. The sensor according to claim 1, wherein said at least one polarization element comprising at least one Pockels cell.

4. The sensor according to claim 1, wherein said at least one polarization element comprising at least one Kerr cell.

5. The sensor according to claim 1, wherein at least one polarization filter being provided between said at least one light source and said at least one light detector.

6. The sensor according to claim 1, wherein said at least one light source being configured such that said emission light is linearly polarized.

7. The sensor according to claim 1, wherein said material web having a normal and said emission light strikes said material web at an acute angle with respect to said normal on said material web.

8. The sensor according to claim 7, wherein said acute angle approximately corresponds to the Brewster angle.

9. The sensor according to claim 5, wherein said material web having a normal and said emission light strikes said material web at an acute angle with respect to said normal on said material web.

10. The sensor according to claim 9, wherein said acute angle approximately corresponds to the Brewster angle.

11. The sensor according to claim 1 wherein said marking comprises a metal strip.

12. The sensor according to claim 11 wherein said metal strip is embedded in the surface of said material web.

13. The sensor according to claim 11 wherein said metal strip comprises aluminium.

* * * * *